United States Patent
Son et al.

(10) Patent No.: US 7,484,025 B2
(45) Date of Patent: Jan. 27, 2009

(54) PC CARD AND PC CARD CONTROL METHOD

(75) Inventors: Masayoshi Son, Tokyo (JP); Satoru Yoshikawa, Kounan (JP)

(73) Assignees: Softbank BB Corp, Tokyo (JP); Suncorporation, Aichi (JP)

( * ) Notice: Subject to any disclaimer, the term of this patent is extended or adjusted under 35 U.S.C. 154(b) by 148 days.

(21) Appl. No.: 10/554,401

(22) PCT Filed: Apr. 21, 2004

(86) PCT No.: PCT/JP2004/005733

§ 371 (c)(1), (2), (4) Date: Nov. 14, 2006

(87) PCT Pub. No.: WO2004/107148

PCT Pub. Date: Dec. 9, 2004

(65) Prior Publication Data

US 2007/0101036 A1 May 3, 2007

(30) Foreign Application Priority Data

Apr. 24, 2003 (JP) .............................. 2003-120194

(51) Int. Cl.
*G06F 13/00* (2006.01)

(52) U.S. Cl. .............................. 710/301; 710/8; 710/10; 710/15; 710/16; 710/104; 711/115

(58) Field of Classification Search ................. 710/301, 710/302, 104, 8, 10, 15, 16; 711/115
See application file for complete search history.

(56) References Cited

U.S. PATENT DOCUMENTS

| | | | | |
|---|---|---|---|---|
| 5,613,092 A | * | 3/1997 | Lim et al. .................... | 710/301 |
| 6,665,190 B2 | * | 12/2003 | Clayton et al. ............... | 361/736 |
| 7,136,950 B2 | * | 11/2006 | Mowery et al. .............. | 710/301 |
| 2001/0009501 A1 | * | 7/2001 | Nabetani et al. ............. | 361/684 |
| 2002/0111771 A1 | * | 8/2002 | Huang et al. ................. | 702/186 |
| 2003/0084220 A1 | * | 5/2003 | Jones et al. .................. | 710/301 |
| 2003/0172263 A1 | * | 9/2003 | Liu ............................. | 713/156 |
| 2004/0059860 A1 | * | 3/2004 | Liu et al. ..................... | 710/313 |
| 2005/0225950 A1 | * | 10/2005 | Matsuda et al. .............. | 361/737 |

FOREIGN PATENT DOCUMENTS

| | | |
|---|---|---|
| JP | 7-152609 | 6/1995 |
| JP | 8-123932 | 5/1996 |
| JP | 8-180148 | 7/1996 |
| JP | 10-171957 | 6/1998 |

(Continued)

*Primary Examiner*—Glenn A Auve
(74) *Attorney, Agent, or Firm*—Maier & Maier, PLLC (57) ABSTRACT

A PC card and a method of controlling the PC card is provided which can be used to add multiple capabilities to an information processing apparatus in cooperation with a conventional card only by the use of a single card slot.

The PC card 1 is provided with a multifunctional adapter unit 2 which controls data exchange between the information processing apparatus 20 and the function of the PC card or data exchange between the information processing apparatus 20 and the function of the PHS card, and a PC card function control unit 3 which controls the function of the PC card. The multifunctional adapter unit 2 of the PC card 1 is provided with a communication control unit 2*a*, an address control unit 2*b*, a driving system setting unit 2*c*, and an interrupt request control unit 2*d*. The address control unit 2*b* controls address operations in order that the address area used by the PC card function control unit 3 shall not overlap the address area used by the PHS card function control unit 4 in the memory space which is accessed by the information processing apparatus 20 through the PC card 1.

7 Claims, 7 Drawing Sheets

FOREIGN PATENT DOCUMENTS

| | | |
|---|---|---|
| JP | 11-24807 | 1/1999 |
| JP | 11306129 | 11/1999 |
| JP | 11-340980 | 12/1999 |
| JP | 2000-75974 | 3/2000 |
| JP | 2001-273465 | 10/2001 |
| JP | 2000-157056 | 5/2002 |
| JP | 2002-366501 | 12/2002 |
| JP | 2003-63077 | 3/2003 |
| JP | 2004-133539 | 4/2004 |
| JP | 2004-157801 | 6/2004 |

* cited by examiner

PC CARD AND PC CARD CONTROL METHOD

TECHNICAL FIELD

The present invention relates to a PC card and a method a of controlling the PC card which can be used to add multiple capabilities to an information processing apparatus.

BACKGROUND ART

A PC card provides a wireless LAN capability, a PHS communication capability, a portable telephone communication capability, a memory capability and so forth, and can be plugged into an information processing apparatus such as a personal computer to make use of these capabilities.

In order to add multiple capabilities to an information processing apparatus, a plurality of PC cards have to be plugged into the information processing apparatus, and therefore a plurality of slots must be available for connection. As conventional personal computers have been downsized, in many models, particularly laptop personal computers, there is only one slot for a PC card to enable a functional extension.

On the other hand, the technique is disclosed that a plurality of PC cards are linked in series so that multiple capabilities can be added to a personal computer only by the use of a single slot (for example, refer to Japanese Patent Published Application No. Hei 2000-75974, paragraph "0027", FIG. 3).

However, in the case where a plurality of PC cards are simply connected to each other, they can be easily come off from each other and therefore it is not practical. In addition, such a PC card has a special structure for the serial connection and a proprietary controller inside thereof and therefore conventional cards cannot be used.

Taking into consideration the above shortcomings, it is an object of the present invention to provide a PC card which can be used to add multiple capabilities to an information processing apparatus in cooperation with a conventional card only by the use of a single card slot, and a method of controlling this PC card.

SUMMARY OF THE INVENTION

In order to accomplish the above object, the first feature of the present invention resides in a PC card having a connection plug connectable to an information processing apparatus, and a card connector through which an additional card can be connected, wherein multiple capabilities are added to the information processing apparatus by connecting the PC card to the information processing apparatus, the PC card comprising:

(a) a communication control unit configured to control communication between the information processing apparatus and a function control unit of the PC card, and communication between the information processing apparatus and a function control unit of the additional card; and (b) an address control unit configured to control address operations, when the information processing apparatus refers to the PC card, in order that a card information structure and card configuration information of the additional card are located from the initial address of an attribute area of the PC card, and thereafter a card information structure and card configuration information of the PC card are located.

In this description, a "PC card" is a card which is inserted into an information processing apparatus to add a certain capability such as a wireless capability or a memory capability to the information processing apparatus. Such an information processing apparatus may be a personal computer (PC), a notebook type personal computer, or any other appropriate device such as a cellular phone, a PHS, a PDA, an electronic organizer, a digital camera, a car navigation system, a scanner, or a printer. Also, the "card information structure" is information about the type of card, the manufacturer, the name of product, and other properties of an individual card as determined in advance. The "card configuration information" is information required for activating the card including setting registers such as CCOR (Card Configuration Option Register) and CCSR (Card Configuration Status Register), the base addresses of the setting registers, the drive voltage level, the type of interface, the capability of the device, the IRQ number and so forth.

By the use of the PC card in accordance with the first feature of the present invention, it is possible to add multiple capabilities to an information processing apparatus in cooperation with a conventional card only by the use of a single card slot. Also, it is possible to control address operations in order that the address area used by the function control unit of the PC card shall not overlap the address area used by the function control unit of the additional card in the memory space which is accessed by the information processing apparatus through the PC card.

In addition, the PC card in accordance with the first feature further comprises a driving system setting unit configured to set the driving system of the function control unit of the PC card. In accordance with this PC card, it is possible to initialize the attribute area of the PC card function control unit, which cannot be accessed from the information processing apparatus, inside of the PC card.

Also, the PC card in accordance with the first feature further comprises an interrupt request control unit that, when an interrupt request is received from the function control unit of the PC card, saves information about the interrupt request, and when an interrupt request is received from the additional card, transferring the interrupt request to the information processing apparatus. In accordance with this PC card, both the processes of handling interrupts issued from the PC card 1 and the additional card can be controlled by transferring the interrupt request signal of the function control unit of the additional card as the interrupt request signal assigned to the card slot, and monitoring the interrupt request signal from the PC card function control unit by a dedicated software of the information processing apparatus.

Furthermore, in the PC card in accordance with the first feature, the function control unit of the PC card is provided with a wireless LAN communication capability, and the function control unit of the additional card is provided with a PHS communication capability. In accordance with this PC card, it is possible to add a wireless communication capability and a PHS communication capability to the information processing apparatus.

A second feature of the present invention resides in a method of controlling a PC card having a connection plug connectable to an information processing apparatus, and a card connector through which an additional card can be connected, wherein multiple capabilities are added to the information processing apparatus by connecting the PC card to the information processing apparatus, the method comprising:

(a) a step of controlling communication between the information processing apparatus and a function control unit of the PC card, and communication between the information processing apparatus and a function control unit of the additional card; and (b) a step of controlling address operations, when the information processing apparatus refers to the PC card, in order that a card information structure and card configuration information of the additional card are located from the initial address of an attribute area of the PC card, and thereafter a card information structure and card configuration information of the PC card are located.

The method of controlling a PC card in accordance with the second feature of the present invention makes it possible to add multiple capabilities to the information processing apparatus in cooperation with a conventional card only by the use of a single card slot. Also, it is possible to control address operations in order that the address area used by the function control unit of the PC card shall not overlap the address area used by the function control unit of the additional card in the memory space which is accessed by the information processing apparatus through the PC card.

In addition, the method of controlling a PC card in accordance with the second feature may further comprises a step of setting the driving system of the function control unit of the PC card. In accordance with this method of controlling a PC card, it is possible to initialize the attribute area or the PC card function control unit, which cannot be accessed from the information processing apparatus, inside of the PC card.

Also, the method of controlling a PC card in accordance with the second feature may further comprises a step of, when an interrupt request is received from the function control unit of the PC card, saving information about the interrupt request, and when an interrupt request is received from the additional card, transferring the interrupt request to the information processing apparatus. In accordance with this method of controlling a PC card, both the processes of handling interrupts issued from the PC card and the additional card can be controlled by transferring the interrupt request signal of the function control unit of the additional card as the interrupt request signal assigned to the card slot, and monitoring the interrupt request signal from the PC card function control unit by a dedicated software of the information processing apparatus.

BEST MODE FOR CARRYING OUT THE INVENTION

Next, with reference to drawings, an embodiment in accordance with the present invention will be explained. Throughout the following drawings, like references indicate functionally same or similar elements. However, the drawings are presented only schematically, and the actual thicknesses and dimensions should be determined taking into consideration the following description.

(Outer Configuration of A PC Card)

Figure 1:
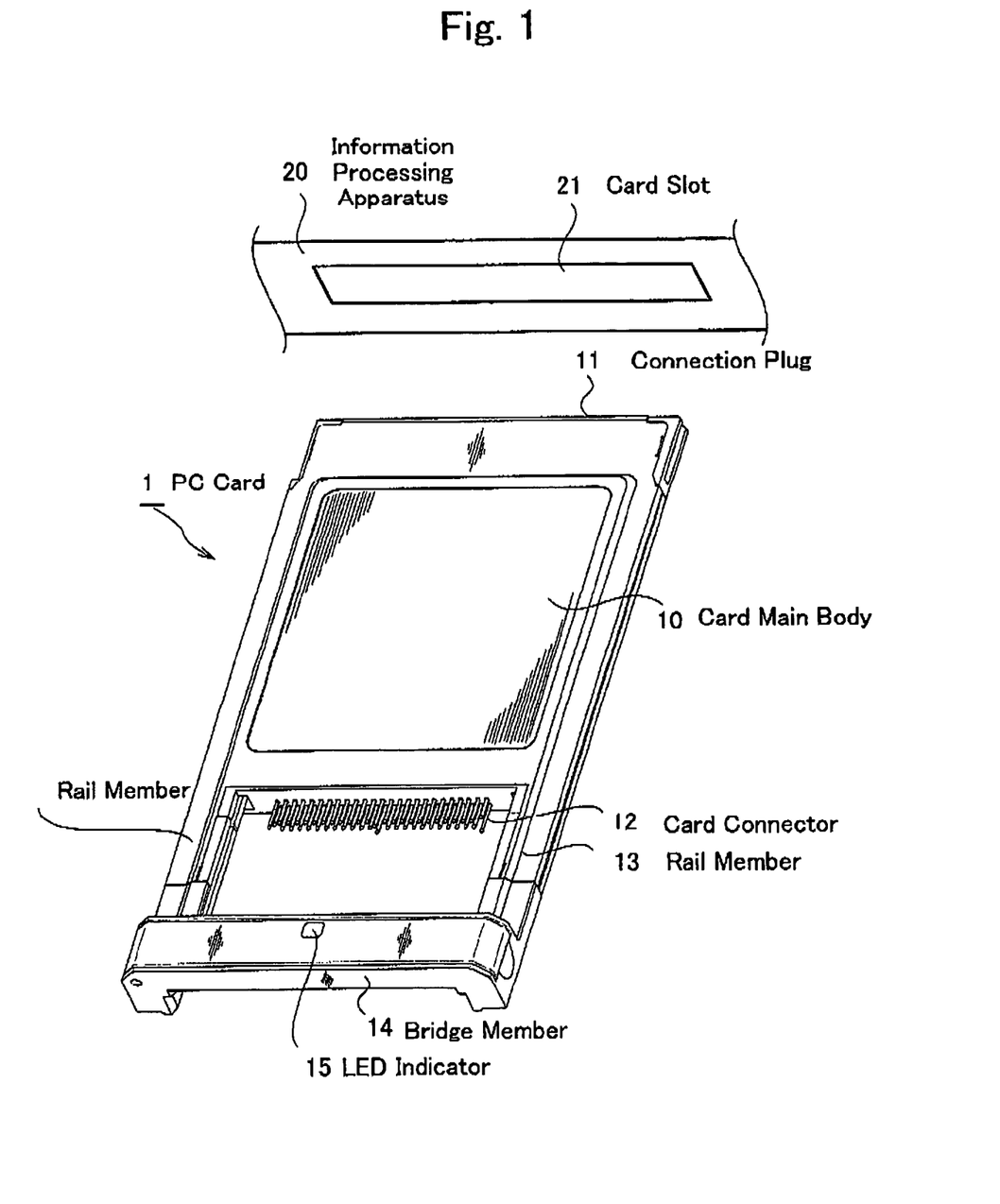
FIG. 1 is a perspective view showing a PC card in accordance with an embodiment of the present invention.

The PC card in accordance with the first embodiment of the present invention comprises a card main body 10 to be inserted into a card slot 21 of an information processing apparatus 20, a pair of parallel rail members 13, and a bridge member 14 with which the pair of the rail members 13 are connected as illustrated in FIG. 1.

The card main body 10 is provided with a connection plug 11 for connecting with the information processing apparatus 20, and a card connector 12 to which an additional card can be connected. The card main body 10 is provided with a capability implemented therein such as a wireless LAN capability, a PHS communication capability, a portable telephone communication capability, a memory capability or the like, and serves to add multiple capabilities including the capability of the additional card to the information processing apparatus 20.

Figure 2:
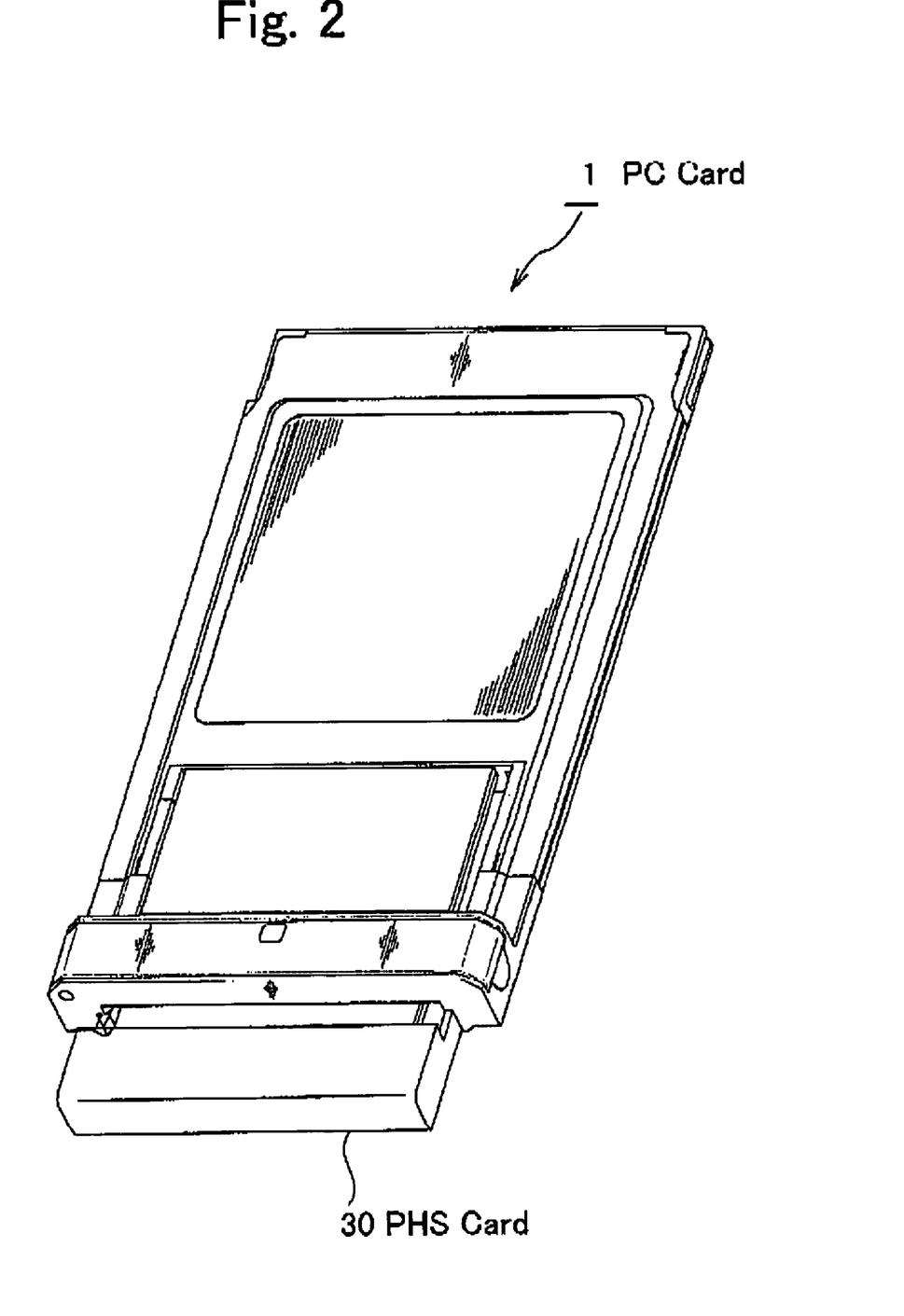
FIG. 2 is a view showing the PC card in accordance with the embodiment of the present invention into which a PHS card is inserted.

The rail members 13 is used to guide the additional card for insertion. FIG. 2 shows the PC card 1 into which a PHS card 30 is inserted as an additional card. The PHS card 30 is inserted into the PC card 1 along the rail members 13, and connected to the card connector 12.

The bridge member 14 is located in order not to block the insertion path of the additional card 30 when the PHS card 30 is inserted between the rail members 13. Since the bridge member 14 is provided, it is possible to improve the stiffness of the rail members 13 and the ability of holding the PHS card 30 as inserted. Incidentally, in the case where the PC card has a communication capability, the bridge member 14 is preferably provided with an LED indicator 15. The LED indicator 15 serves to indicate the communication state, for example, by illuminating blue during communication, so that the user can visually confirm the current communication state.

The additional card as inserted into the PC card is preferably a CF Type I or CF Type II card designed in compliance with the CFA (Compact Flash Association) standard. More specifically speaking, a Compact Flash (registered trademark) card (CF card) can be used besides a PHS card. The standard size of CF Type I is 36.4 mm length×42.8 mm width×3.3 mm thickness, and the standard size of CF Type II is 36.4 mm length×42.8 mm width×5.0 mm thickness. The PC card 1 in accordance with the embodiment is provided with the card connector 12 in conformity with this type of the card 30, and the rail members 13 and the bridge member 14 can be designed to hold any card which is compliant with this standard. If the PC card 1 in accordance with the embodiment is designed to have the above outer dimensions, there is the advantage that a marketed card can be used as the additional card 30.

On the other hand, the outer dimensions of the PC card 1 in accordance with the embodiment are preferably in compliance with the PC card standard Type I, Type II and Type III.

Since a conventional card can be inserted into the PC card 1 in accordance with the first embodiment, both the function of the PC card 1 and the function of the conventional card 30 as inserted thereinto can be added to the information processing apparatus 20 by the use of only one card slot 21 of the information processing apparatus 20. Also, by providing the bridge member 14, it is possible to secure the stiffness of the frame member 13 longitudinally extended in order that the additional card 30 is inserted into it, and also possible to enhance the facility of holding the additional card 30.

(Internal Functions of The PC Card)

Next, the internal function of the PC card 1 in accordance with the embodiment of the present invention will be explained with reference to FIG. 3. In the following explanation, it is assumed that the additional card inserted into the PC card 1 is a PHS card which is compliant with the CFA standard.

The PC card 1 is provided with a multifunctional adapter unit 2 which controls data exchange between the information processing apparatus 20 and the function of the PC card or data exchange between the information processing apparatus 20 and the function of the PHS card, and a PC card function control unit 3 which controls the function of the PC card.

The function of the PC card is controlled by the PC card function control unit 3, and can be one of a wireless LAN capability, a PHS communication capability, a portable telephone communication capability, a memory capability and so forth. The PC card function control unit 3 and the multifunctional adapter unit 2 can be implemented within a single IC chip.

The PHS card 30 has a PHS communication capability which is controlled by a PHS card function control unit 4. In the case of the embodiment of the present invention, since the additional card inserted into the PC card is a PHS card, a PHS communication capability is added. However, needless to say, the additional card can be a card having a wireless LAN communication capability, a memory capability or the like. For example, if the PC card 1 incorporates a wireless LAN the communication capability with a PHS card inserted thereinto, both the wireless LAN communication capability and the PHS communication capability can be added to the information processing apparatus 20. In this case, if a wireless LAN service can be used, the information processing apparatus 20 starts communication through the wireless LAN, and if no wireless LAN service can be used, the information processing apparatus 20 can start communication by the PHS communication capability.

The multifunctional adapter unit 2 of the PC card 1 in accordance with the embodiment of the present invention is provided with a communication control unit 2a, an address control unit 2b, a driving system setting unit 2c, and an interrupt request control unit 2d.

The multifunctional control unit 2a controls the communication between the information processing apparatus 20 and the PC card function control unit 3, and the communication between the information processing apparatus 20 and the PHS card function control unit 4.

The address control unit 2b controls address operations in order that the address area used by the PC card function control unit 3 shall not overlap the address area used by the PHS card function control unit 4 in the memory space which is accessed by the information processing apparatus 20 through the PC card 1. This address relocation control method will be explained in detail with reference to FIG. 4.

Figure 4:
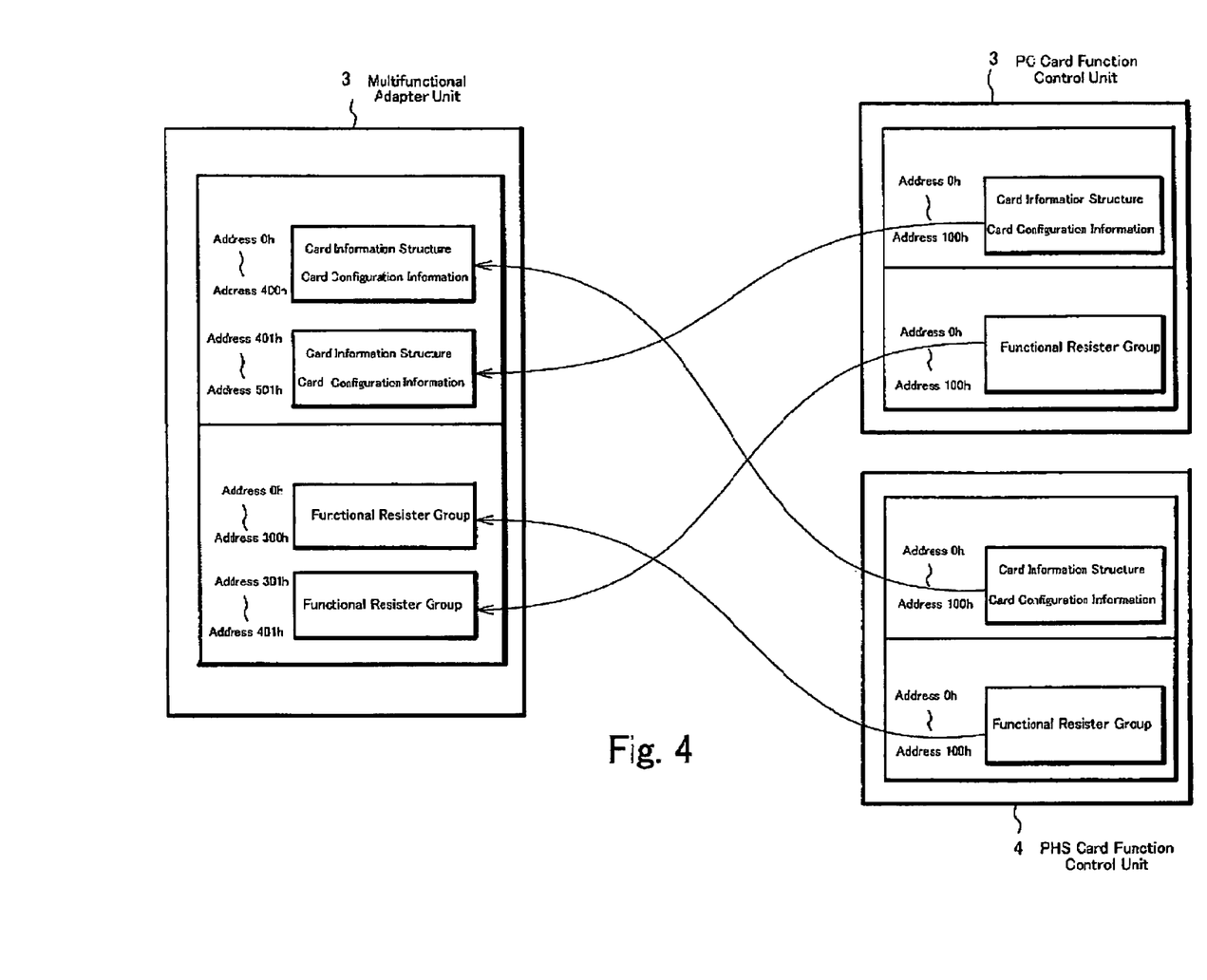
FIG. 4 is a view for explaining the address control by a multifunctional adapter unit.

The memory space for each of the PC card function control unit 3 and the PHS card function control unit 4 includes an attribute area in which card information is stored, and an I/O area in which a register group is allocated for use in the operation of the function of the PC card such as a communication capability. The attribute area is used to store card property information (a Card Information Structure (CIS)) and card configuration information. The "card information structure" is information about the type of card, the manufacturer, the name of product, and other properties of an individual card as determined in advance. The "card configuration information" is information required for activating the card including setting registers such as CCOR (Card Configuration Option Register) and CCSR (Card Configuration Status Register), the base addresses of the setting registers, the drive voltage level, the type of interface, the capability of the device, the IRQ number and so forth.

A PC card driver is installed in the information processing apparatus 20 which can recognize and access the locations of the attribute area and I/O area through the driver. However, since there are the attribute areas and the I/O areas of both the PC card and the PHS card in the case of the embodiment of the present invention, the multifunctional adapter unit 2 is responsible for making it possible for the information processing apparatus 20 to recognize these areas for both the PC card and the PHS card. The address control unit 2b serves to displace the locations of the attribute area and I/O area of the PC card function control unit 3 in order that the information processing apparatus 20 can recognize these areas for both the PC card and the PHS card.

For example, in the memory space of the PC card function control unit 3 as illustrated in FIG. 4, it is assumed that the card information structure and the card configuration information are located from address 0h to address 100h of the attribute area and that the functional register group is allocated from address 0h to address 100h of the I/O area. On the other hand, in the memory space of the PHS card function control unit 4, it is assumed that the card information structure and the card configuration information are located from address 0h to address 300h of the attribute area and that the functional register group is allocated from address 0h to address 400h of the I/O area. The address control unit 2b serves to relocate these addresses in order that the information processing apparatus 20 can access the card information structure and card configuration information of the PHS card in the address area relocated to 0h to 400h, and the card information structure and card configuration information of the PC card in the address area relocated to 401h to 501h. Also, the address control unit 2b serves to relocate the functional register group of the PHS card to the address area of 0h to 300h of the I/O area and the functional register group of the PC card to the address area of 301h to 401h of the I/O area. Namely, the information of the PHS card function control unit 4 is located in the lower addresses of the attribute area and I/O area, while the information of the PC card function control unit 3 is located in the addresses after the information of the PHS card function control unit 4. As has been discussed above, the information of the PHS card is stored from the first addresses of the attribute area and I/O area in the same manner as in conventional use, and therefore it is possible to use a commercially available card by inserting it into the PC card.

Figure 3:
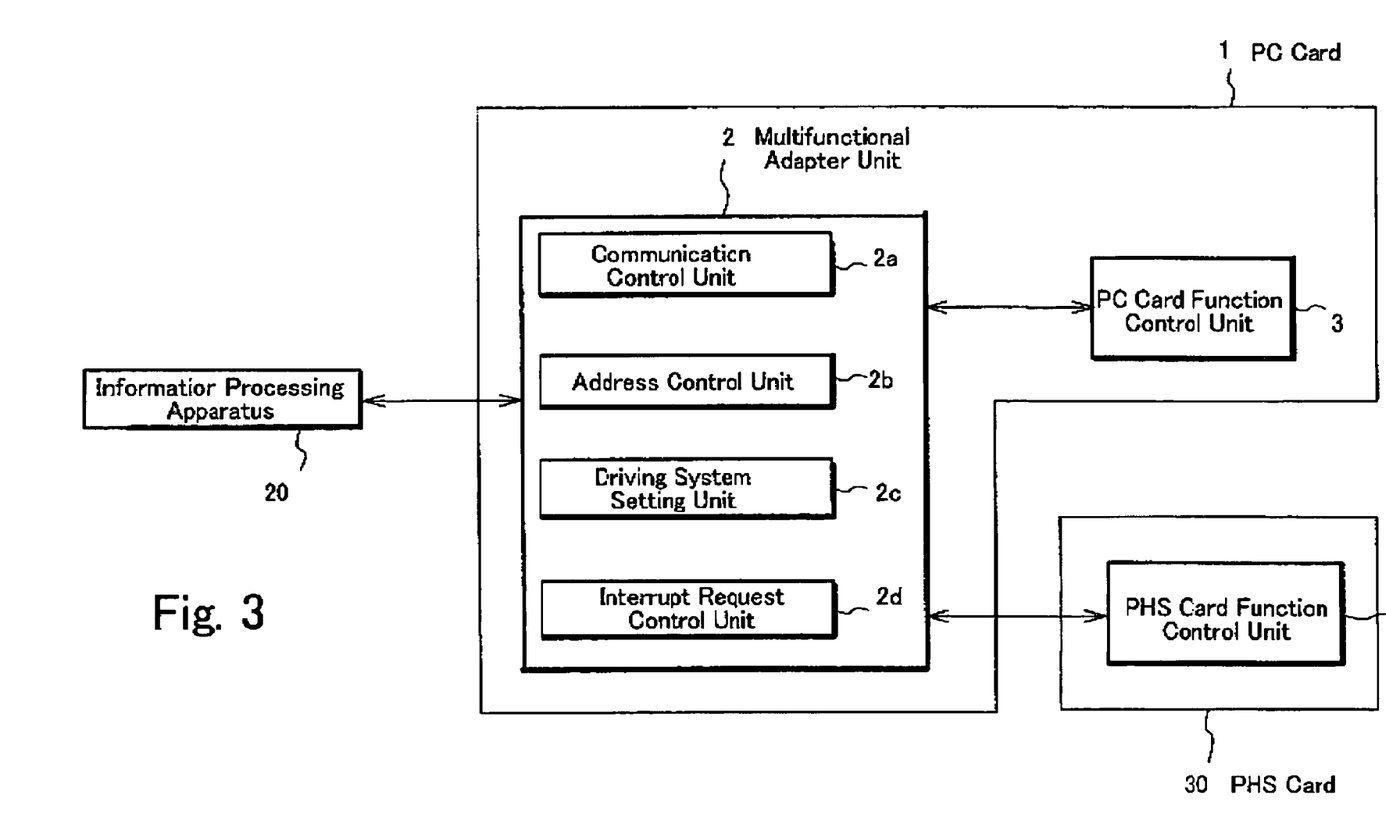
FIG. 3 is a block diagram showing the configuration of the PC card in accordance with the embodiment of the present invention.

On the other hand, the driving system setting unit 2c of FIG. 3 serves to set the driving system of the PC card function control unit 3. Usually, setting the driving system is performed by the information processing apparatus 20. However, in the case of the embodiment of the present invention, the PC card 1 cannot allocate the address area for the attribute area of the PC card function control unit 3 from the address 0h (the address area is allocated from the address 401h in FIG. 4), and therefore the information processing apparatus 20 cannot access the attribute area in the allocated address area). Because of this, the driving system of the attribute area is set inside of the PC card 1. More specifically speaking, the CCOR contained in the card configuration information.

When receiving an interrupt request from the PC card function control unit 3, the interrupt request control unit 2d saves the interrupt request information instead of transferring it to the information processing apparatus 20. The interrupt request information is saved by setting a flag which is contained, for example, in the card configuration information.

Contrary to this, when an interrupt request from the PHS card function control unit 4 is received, it is transferred to the information processing apparatus 20. Usually, a PC card slot is assigned to only one interrupt request signal. This signal is used as the interrupt request signal of the PHS card function control unit 4. The interrupt request signal of the PC card function control unit 3 is monitored and recognized by a dedicated software which is implemented in the information processing apparatus 20 for monitoring the interrupt request signal.

In accordance with the PC card 1 of the embodiment of the present invention, it is possible to add multiple capabilities to the information processing apparatus 20 with the conventional card 30 only by the use of one card slot 21. Also, the address control unit 2b controls address operations in order that the address area used by the PC card function control unit 3 shall not overlap the address area used by the PHS card function control unit 4 in the memory space which is accessed by the information processing apparatus through the PC card. In addition, it is possible to initialize the attribute area of the PC card function control unit 3, which cannot be accessed from the information processing apparatus 20, inside of the PC card 1 by the driving system setting unit 2c. Furthermore, while the interrupt request signal of the PHS card function control unit 4 is transferred by the interrupt request control unit 2d as the interrupt request signal assigned to the card slot 21, the interrupt request signal from the PC card function control unit 3 is monitored by the dedicated software of the information processing apparatus 20 in order to control both the interrupt handling process for the PC card 1 and the PHS card 30.

(Control Method of The PC Card)

Next, the method of controlling the PC card in accordance with the present invention will be explained. First of all, the initialization of the PC card will be explained with reference to FIG. 5 together with FIG. 1 and FIG. 3. Incidentally, in the following explanation, it is assumed that the card inserted into the PC card is a PHS card, and that the information processing apparatus into which the PC card is inserted is a personal computer (referred to herein as "PC").

Figure 5:
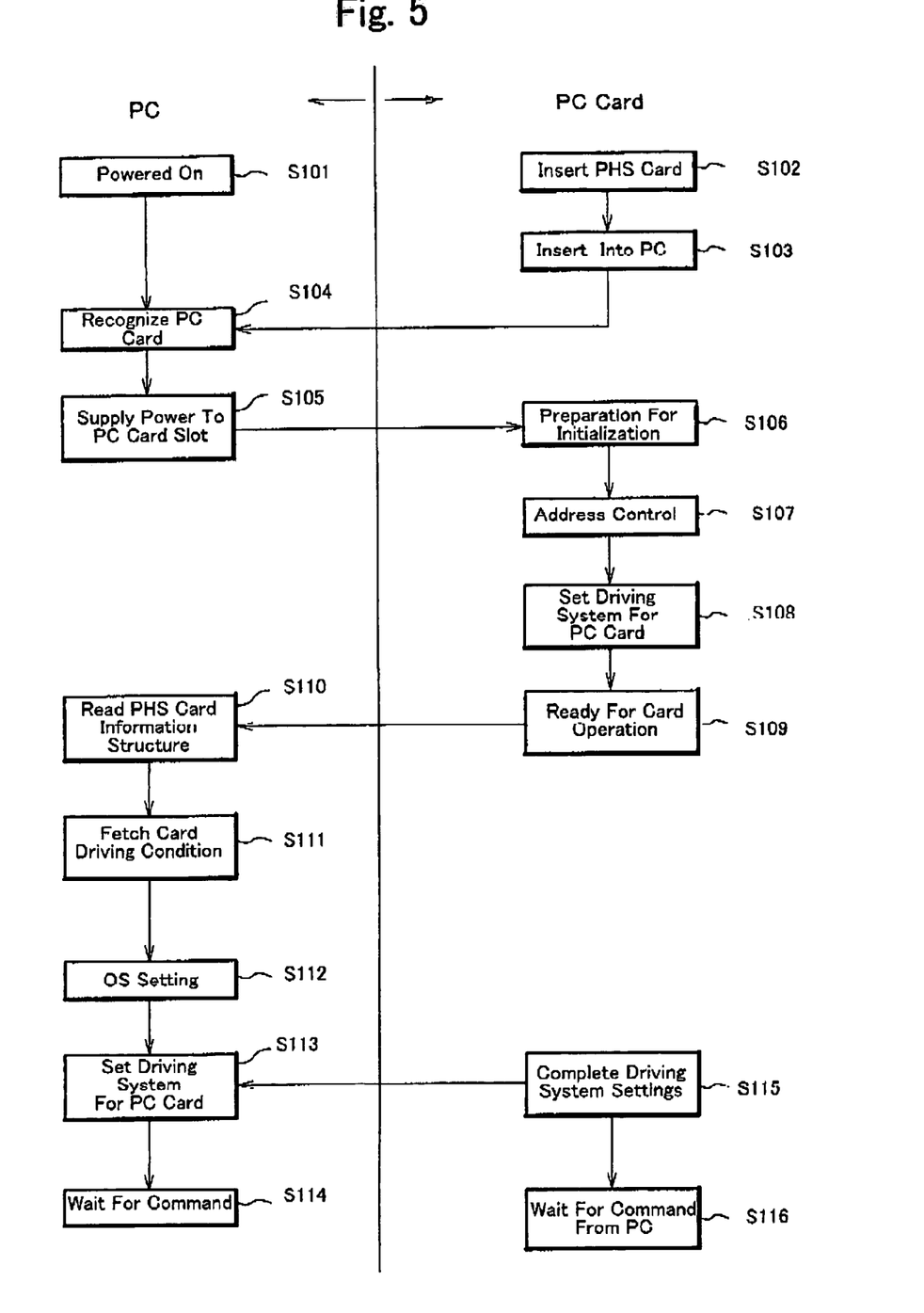
FIG. 5 is a flowchart showing the initialization process of the control method of the PC card in accordance with the embodiment of the present invention.

(a) First, the PC 20 is powered up in step S101 of FIG. 5. On the other hand, in step S102, the PHS card 30 is inserted into the PC card 1 which in turn is inserted into the PC 20. Next, the PC 20 recognizes insertion of the PC card 1 in step S104, and then supplies power to the PC card slot 21 in step S105.

(b) Next, in step S106, the necessary preparations are performed for initializing the inside circuit of the PC card. In this case, the communication control unit 2a of the multifunctional adapter unit 2 recognizes the memory space of the PC card function control unit 3 and the memory space of the PHS card function control unit 4. Next, in step S107, the address control unit 2b controls address operations in order that the address area used by the PC card function control unit 3 shall not overlap the address area used by the PHS card function control unit 4 in the memory space which is accessed by the PC 20 through the PC card 1. Namely, the address control unit 2b locates the card information structure and the card configuration information of the PHS card function control unit 4 from address 0h of the attribute area, and then locates the card information structure and the card configuration information of the PC card function control unit 3 after the card configuration information of the PHS card function control unit 4 in the attribute area. Likewise, the address control unit 2b locates the functional register group of the PHS card function control unit 4 from address 0h of the I/O area, and then locates the functional register group of the PC card function control unit 3 after the functional register group of the PHS card function control unit 4 in the I/O area.

(c) Next, in step S108, the driving system setting unit 2c performs the setting of the driving system of the PC card function control unit 3. More specifically speaking, the CCOR contained in the card configuration information. Basically, the card information structure and the card configuration information of the attribute area is located from address 0h of the attribute area, and thereby the PC 20 cannot access the card information structure and the card configuration information of the PC card function control unit 3. Accordingly, the driving system setting unit 2c of the multifunctional adapter unit 2 serves to perform the setting of the driving system in the PC card 1.

(d) After completing the preparation of driving these cards in step S109, the communication control unit 2a transmits a notification signal indicative of the completion of initialization to the PC 20, and notifies the PC 20 that the card information structure of the PC card can be read. Next, in step S110, the PC 20 reads the card information structure of the PHS card function control unit 4 through the communication control unit 2a. The card information structure of the PHS card is located from address 0h of the attribute area by the address control unit 2b, and thereby the PC 20 can access it.

(e) Next, in step S111, the PC 20 fetches a card driving condition which has been registered in an INF file from a hard disk on the basis of the card information structure of the PC card as notified in step S109 and the card information structure of the PHS card as read in step S110. In the case of the configuration as illustrated in FIG. 4, for example, the INF file contains address 301h, from which the functional register group of the PC card function control unit 3 is located, and so forth in addition to the card driving condition, so that the PC 20 can access the functional register groups of both the PC card and the PHS card.

(f) Next, in step S112, the PC 20 determines that the PC card 1 is a PC card having two capabilities of the function of the PC card and the function of the PHS card with reference to the card configuration information of the PC card and the card configuration information of the PHS card. Then, necessary settings are made in the OS in order that the two capabilities can work properly on the OS.

(g) Next, in step S113, the PC 20 performs the setting of the driving system of the PHS card function control unit 4. More specifically speaking, necessary settings are made in the CCOR contained in the card configuration information. By this process, the PC card function control unit 3 and the PHS card function control unit 4 are ready for operation, and the PC 20 is waiting for a command from an application software and so forth in step S114. On the other hand, after completing the settings of the driving system of the PHS card function control unit 4 in step S115, the PC card 1 is also waiting for a command from the PC 2 in step S116.

Figure 6:
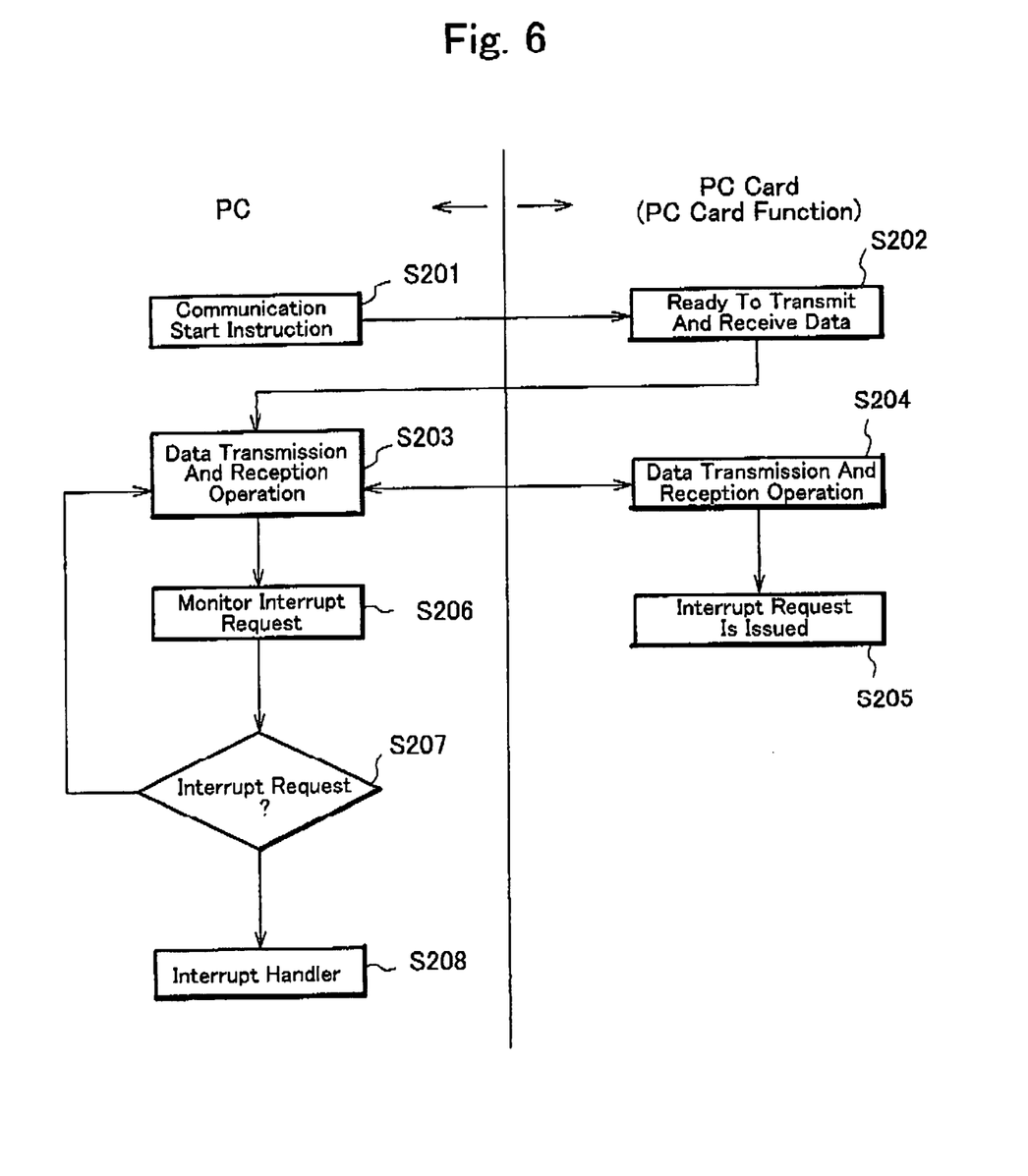
FIG. 6 is a flowchart (Part 1) showing an interrupt handling process of the control method of the PC card in accordance with the embodiment of the present invention.
Figure 7:
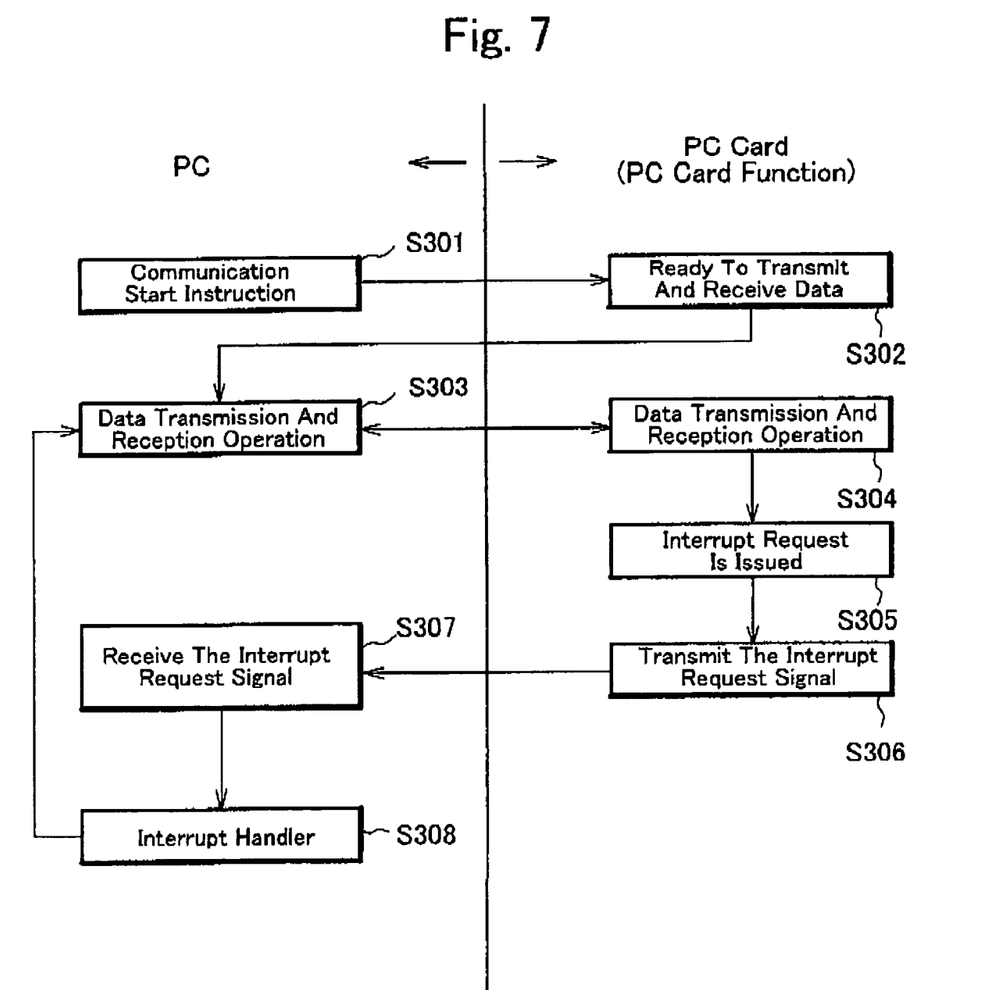
FIG. 7 is a flowchart (Part 2) showing the interrupt handling process of the control method of the PC card in accordance with the embodiment of the present invention.

Next, the control method of the process of handling interrupts will be explained with reference to FIG. 6 and FIG. 7. Usually, since a PC card slot is assigned to only one interrupt request signal, this interrupt request signal is used by the PHS card function control unit 4, and the PC 20 periodically monitors the interrupt request from the PC card function control unit 3.

At first, the handling of the interrupt request from the PC card function control unit 3 will be explained with reference to FIG. 6.

(a) First, in step S201, the PC 20 transmits a communication start instruction. When the PC card function control unit 3 is ready to transmit and receive data in step S202, the data transmission and reception operation is performed between the PC 2 and the PC card function control unit 3 through the communication control unit 2a of the multifunctional adapter unit 2 in steps S203 and S204.

(b) In this case, it is assumed that an interrupt request is issued from the PC card function control unit 3 in step S205. The interrupt request control unit 2d does not transmit the interrupt request, which is received from the PC card function control unit 3, to the PC 2, but save the fact of this reception by setting a flag. or the like. The interrupt request is, for example, the interrupt request indicative that there is an available space occurring in a transmission buffer, the interrupt request indicative that there is incoming data, and so forth.

(c) On the other hand, in step S206, the PC repeatedly monitors the interrupt request control unit 2d to determine whether or not there is an interrupt request. This monitoring routine is implemented by the dedicated software which has been installed in the PC 20. In step S207, when it is determined that there is an interrupt request, the PC 20 proceeds to step S208 in which an interrupt handler is invoked in the same manner as an interrupt handler for hardware interrupt. This operation is called a "polling control". In the case where there is no interrupt request, the processing proceeds to step S203 in which usual data transmission and reception is performed.

Next, the handling of the interrupt request from the PHS card function control unit 4 will be explained with reference to FIG. 7.

(a) First, in step S301, the PC 20 transmits a communication start instruction. When the PHS card function control unit 4 is ready to transmit and receive data in step S302, the data transmission and reception operation is performed between the PC 2 and the PHS card function control unit 4 through the communication control unit 2a of the multifunctional adapter unit 2 in steps S303 and S304.

(b) Next, when there is an interrupt request from the PHS card function control unit 4 in step S305, the PHS card function control unit 4 transmits the interrupt request as an interrupt request signal through the PC card slot to the PC 20 in step S306.

(c) The PC 20 receives the interrupt request in step S307, and runs the interrupt handler in step S308.

In accordance with the control method of the PC card 1 in accordance with the embodiment of the present invention, it is possible to add multiple capabilities to the information processing apparatus 20 with the conventional card 30 only by the use of one card slot 21. Also, the address operations can be controlled in order that the address area used by the PC card function control unit 3 shall not overlap the address area used by the PHS card function control unit 4 in the memory apace which is accessed by the information processing apparatus 20 through the PC card 1. In addition, it is possible to initialize the attribute area of the PC card function control unit 3, which cannot be accessed from the information processing apparatus 20, inside of the PC card 1. Furthermore, while the interrupt request signal of the PHS card function control unit 4 is transferred as the interrupt request signal assigned to the card slot 21, the interrupt request signal from the PC card function control unit 3 is monitored by the dedicated software of the information processing apparatus in order to control both the processes of handling interrupts issued from the PC card 1 and the PHS card 30.

Other Embodiments

While the present invention has been described in conjunction with the above embodiments, the present invention should not be limited to the description and drawings as part of the disclosure. The various alternative embodiments, practical applications and implementations will be apparent to those skilled in the art from the disclosure.

For example, while the additional card 30 as an example for explanation is in compliance with the CF Type standard in the case of the embodiments or the present invention, the PC card 1 in accordance with the present invention can be used with a card, even if it is in compliance with another standard and cannot be attached directly to the PC card 1, as long as an appropriate adaptor is available through which the card can be connected to the card connector 12.

Also, the communication control unit 2a, the address control unit 2b, the driving system selling unit 2c, the interrupt request control unit 2d of the multifunctional adapter unit 2 in the internal structure of the PC card as described above can be implemented by hardwired control such as circuitry, or can be implemented by running a dedicated program which is written in a predetermined program.

Needless to say, like this example, a variety of embodiments of the present invention are possible even if not described here. Accordingly, the present invention should be limited only by matters defining an invention in the claims which are appropriate from the view point of the description.

INDUSTRIAL APPLICABILITY

In accordance with the present invention, it is possible to provide a PC card and a method of controlling the PC card which can be used to add multiple capabilities to an information processing apparatus in cooperation with a conventional card only by the use of a single card slot.

What is claimed is:

1. A PC card having a connection plug connectable to an information processing apparatus, and a card connector through which an additional card can be connected, wherein multiple capabilities are added to said information processing apparatus by connecting said PC card to said information processing apparatus, said PC card comprising:

a communication control unit controls communication between said information processing apparatus and a function control unit of said PC card, and communication between said information processing apparatus and a function control unit of said additional card; and an address control unit controls address operations, when said information processing apparatus refers to said PC card, in order that a card information structure and card configuration information of said additional card are located from an initial address of an attribute area of said PC card, and thereafter a card information structure and card configuration information of said PC card are located.

2. The PC card as claimed in claim 1 further comprising a driving system setting unit that initializes the attribute area, sets a card configuration option register in the card configuration information and sets a driving system of the function control unit of said PC card.

3. The PC card as claimed in claim 1 further comprising an interrupt request control unit that, when an interrupt request is received from the function control unit of said PC card, saves information about said interrupt request, and when an interrupt request is received from said additional card, transferring said interrupt request to said information processing apparatus.

4. The PC card as claimed in claim 1 wherein the function control unit of said PC card is provided with a wireless LAN communication capability, and wherein the function control unit of said additional card is provided with a portable telephone communication capability.

5. A method of controlling a PC card having a connection plug connectable to an information processing apparatus, and a card connector through which an additional card can be connected, wherein multiple capabilities are added to said information processing apparatus by connecting said PC card to said information processing apparatus, said method comprising:

a step of controlling communication between said information processing apparatus and a function control unit of said PC card, and communication between said information processing apparatus and a function control unit of said additional card; and     a step of controlling address operations, when said information processing apparatus refers to said PC card, in order that a card information structure and card configuration information of said additional card are located from an initial address of an attribute area of said PC card, and thereafter a card information structure and card configuration information of said PC card are located.

6. The method of controlling a PC card as claimed in claim 5 further comprising a step of initializing the attribute area, setting a card configuration option register in the card configuration information and setting a driving system of the function control unit of said PC card.

7. The method of controlling a PC card as claimed in claim 5 further comprising a step of, when an interrupt request is received from the function control unit of said PC card, saving information about said interrupt request, and when an interrupt request is received from said additional card, transferring said interrupt request to said information processing apparatus.

* * * * *